(12) United States Patent
Jang et al.

(10) Patent No.: US 10,395,825 B2
(45) Date of Patent: Aug. 27, 2019

(54) MULTILAYER CERAMIC CAPACITOR

(71) Applicant: SAMSUNG ELECTRO-MECHANICS CO., LTD., Suwon-Si, Gyeonggi-Do (KR)

(72) Inventors: Su Bong Jang, Suwon-si (KR); Seung Hee Hong, Suwon-si (KR); Hee Soo Yoon, Suwon-si (KR); Sang Jong Lee, Suwon-si (KR); Min Ki Jung, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/004,049

(22) Filed: Jun. 8, 2018

(65) Prior Publication Data
US 2019/0080843 A1  Mar. 14, 2019

(30) Foreign Application Priority Data

Sep. 12, 2017 (KR) .................. 10-2017-0116548

(51) Int. Cl.
*H01G 4/30* (2006.01)
*H01G 4/012* (2006.01)
*H01G 4/228* (2006.01)
(52) U.S. Cl.
CPC ............ *H01G 4/012* (2013.01); *H01G 4/228* (2013.01); *H01G 4/30* (2013.01)

(58) Field of Classification Search
CPC .......... H01G 4/008; H01G 4/012; H01G 4/12; H01G 4/30; H01G 4/232; H01G 4/228; H01G 4/248; H01G 4/1218; H01G 4/1236
See application file for complete search history.

(56) References Cited

U.S. PATENT DOCUMENTS

| 9,087,643 B1* | 7/2015 | Nishibayashi | ......... H01G 4/005 |
| 9,165,715 B2* | 10/2015 | Yoon | ......... H01G 4/30 |
| 2010/0039749 A1* | 2/2010 | Ritter | ......... H01G 4/005 361/301.4 |

(Continued)

FOREIGN PATENT DOCUMENTS

| JP | 2009-130247 A | 6/2009 |
| KR | 10-2015-0042500 A | 4/2015 |

*Primary Examiner* — Nguyen T Ha
(74) *Attorney, Agent, or Firm* — Morgan, Lewis & Bockius LLP

(57) ABSTRACT

A multilayer ceramic capacitor includes a body including a dielectric layer and first and second internal electrodes alternately disposed with the dielectric layer interposed therebetween, and first and second external electrodes disposed on one surface of the body and respectively connected to the first and second internal electrodes. The first internal electrode includes a first main portion and a first lead out portion connecting the first main portion and the first external electrode, the second internal electrode includes a second main portion and a second lead out portion connecting the second main portion and the second external electrode, and the second main portion has a greater area than the first main portion and includes a corner portion defining an open space to compensate for a capacitance formed by an area in which the first lead out portion and the second main portion overlap each other.

12 Claims, 7 Drawing Sheets

(56) References Cited

U.S. PATENT DOCUMENTS

| | | | |
|---|---|---|---|
| 2010/0188799 A1* | 7/2010 | Galvagni | H01G 4/012 361/306.3 |
| 2012/0307417 A1* | 12/2012 | Kim | H01G 4/30 361/321.2 |
| 2015/0014040 A1* | 1/2015 | Ahn | H01G 4/30 174/260 |
| 2015/0103468 A1 | 4/2015 | Hwang | |
| 2016/0049241 A1* | 2/2016 | Uno | H01G 4/12 361/303 |

* cited by examiner

MULTILAYER CERAMIC CAPACITOR

CROSS-REFERENCE TO RELATED APPLICATION

This application claims the benefit of priority to Korean Patent Application No. 10-2017-0116548, filed on Sep. 12, 2017 in the Korean Intellectual Property Office, the disclosure of which is incorporated herein by reference in its entirety.

BACKGROUND

1. Field

The present disclosure relates to a multilayer ceramic capacitor.

2. Description of Related Art

With the miniaturization of mobile communication devices and electronic devices, electronic components applied thereto have rapidly been reduced in weight, integrated, and reduced in thickness. Also, there are a greater number of passive elements applied to mobile communication devices and electronic devices as compared to active elements, and among various passive elements, capacitors, in particular, have come to prominence as demand therefor in circuits outnumbers all other passive elements, and the importance thereof has increased in electrical circuits with growing demand for decoupling capacitors having high capacitance and a short connection length, in line with the development of microelectronics.

Meanwhile, frequency bands applied to mobile communication devices are on the increase, and in the case of capacitors applied to high frequency, narrow-deviation products with small capacity deviation account for more than 70% of the market, and the trend continues to increase. In order to realize a capacitor having a small capacity deviation, it is important to control an effective area of an internal electrode, one of the dominant factors in a capacitance value.

Japanese Patent Laid-Open Publication No. 2009-130247 discloses a multilayer ceramic capacitor in which an effective area of internal electrodes is controlled by controlling a shape of the internal electrodes. However, as the frequency bands gradually increase, development of a multilayer ceramic capacitor having a smaller capacity deviation is required.

SUMMARY

An aspect of the present disclosure may provide a multilayer ceramic capacitor having an internal electrode structure minimizing capacitance variations.

According to an aspect of the present disclosure, a multilayer ceramic capacitor includes a body including a dielectric layer and first and second internal electrodes alternately disposed with the dielectric layer interposed therebetween; and first and second external electrodes disposed on one surface of the body and respectively connected to the first and second internal electrodes. The first internal electrode includes a first main portion and a first lead out portion connecting the first main portion and the first external electrode, the second internal electrode includes a second main portion and a second lead out portion connecting the second main portion and the second external electrode, and the second main portion has a greater area than the first main portion and includes a corner portion defining an open space to compensate for a capacitance formed by an area in which the first lead out portion and the second main portion overlap each other.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
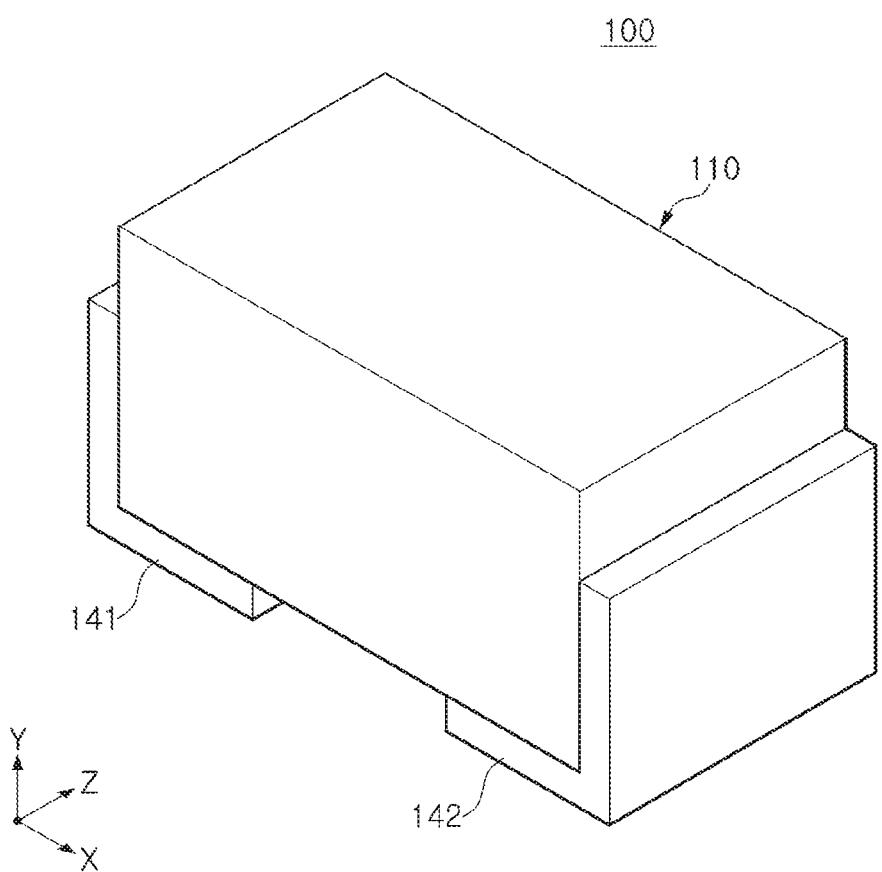
FIG. 1 is a schematic perspective view of a multilayer ceramic capacitor according to an exemplary embodiment in the present disclosure.

Exemplary embodiments of the present disclosure will now be described in detail with reference to the accompanying drawings.

In the drawings, the X direction may be defined as a first direction or a longitudinal direction, the Y direction may be defined as a second direction or thickness direction, and the Z direction may be defined as a third direction, a width direction, or a stacking direction.

Figure 2:
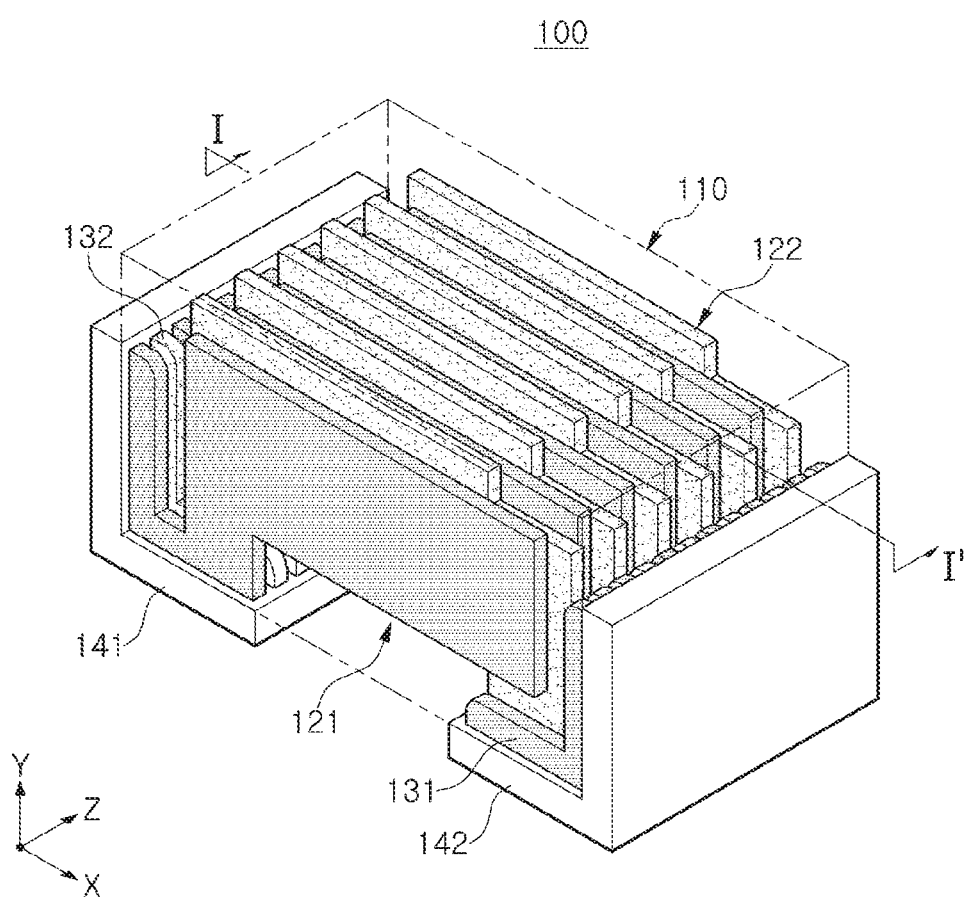
FIG. 2 is a perspective view of the inside of a body in FIG. 1.
Figure 3:
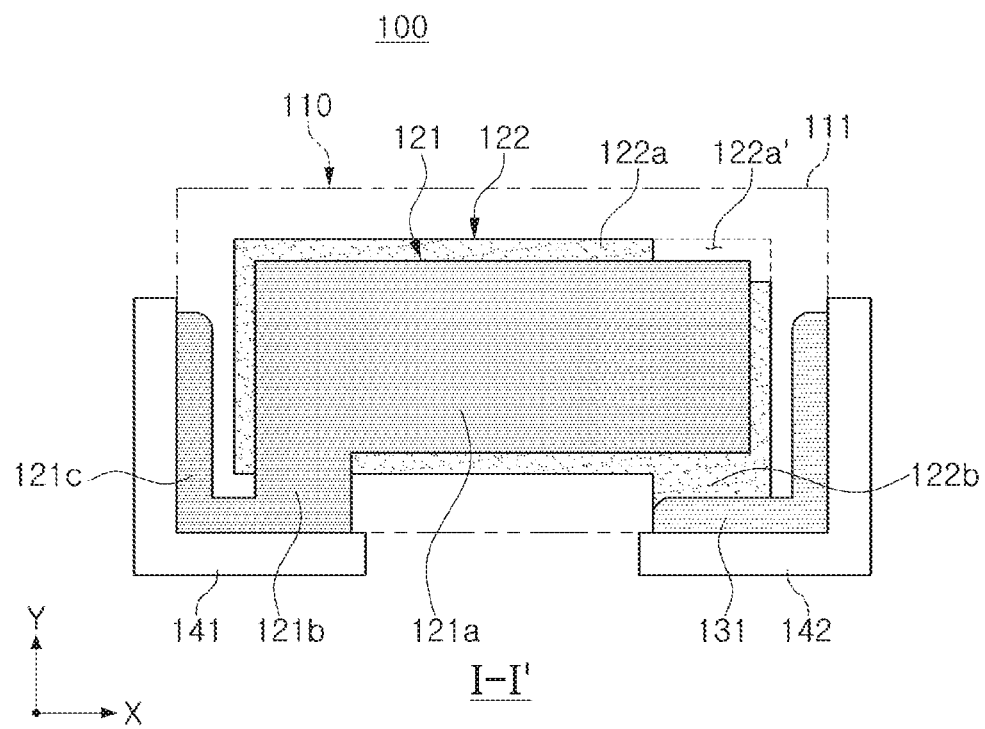
FIG. 3 is a schematic cross-sectional view, taken along line I-I' of FIG. 2.

FIG. 1 is a schematic perspective view of a multilayer ceramic capacitor according to an exemplary embodiment in the present disclosure. FIG. 2 is a perspective view of the inside of a body in FIG. 1. FIG. 3 is a schematic cross-sectional view, taken along line I-I' of FIG. 2.

A structure of a multilayer ceramic capacitor (MLCC) 100 according to an exemplary embodiment in the present disclosure will be described with reference to FIGS. 1 through 3.

The MLCC 100 according to an exemplary embodiment in the present disclosure includes a body 110 and first and second external electrodes 141 and 142 disposed on the exterior of the body.

The body 110 is formed by stacking a plurality of dielectric layers 111 and may be obtained by stacking a plurality of green sheets and subsequently sintering the stacked green sheets. Through the sintering process, the plurality of dielectric layers 111 may have an integrated form. A shape and dimensions of the body 110 and the stacking number of dielectric layers 111 are not limited to those illustrated in the present embodiment. For example, as illustrated in FIG. 1, the body 110 may have a rectangular parallelepiped shape.

The dielectric layer 111 included in the body 110 may include a ceramic material having a high dielectric constant, i.e., a barium titanate ($BaTiO_3$)-based or a strontium titanate ($SrTiO_3$)-based material and may also use any other material known in the art as long as it can obtain sufficient capacitance. The $BaTiO_3$-based ceramic powder may include, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, in which calcium (Ca), zirconium (Zr), and the like, are partially employed in $BaTiO_3$. The dielectric layer 111 may further include an additive, an organic solvent, a plasticizer, a binder, a dispersant, and the like, if necessary, in addition to the ceramic materials as main ingredients. Here, the dielectric layer 111 may include the same material as that included in the internal electrodes 121 and 122, as an additive, and a concentration of the additive may be suitably adjusted locally to secure uniform sintering properties.

The body 110 may be formed by stacking four or more dielectric layers 111. For example, the body 100 may be formed by stacking 400 to 500 dielectric layers. Cover layers formed by stacking dielectric layers 111 without an internal electrode may be disposed on upper and lower surfaces of the body 110 with respect to a stacking direction.

The body 110 includes first and second internal electrodes 121 and 122 disposed to face each other with the dielectric layer 111 interposed therebetween. The first and second internal electrodes 121 and 122 may be connected to different external electrodes 141 and 142 to have different polarities when driven. The first and second internal electrodes 121 and 122 may be obtained by printing a paste containing a conductive metal to a predetermined thickness on one side of the ceramic green sheet and subsequently sintering the paste. The main constituent material of the first and second internal electrodes 121 and 122 may be, for example, nickel (Ni), copper (Cu), palladium (Pd), silver (Ag), or the like, and an alloy thereof may also be used.

The first and second internal electrodes 121 and 122 include first and second main portions 121a and 122a and first and second lead out portions 121b and 122b, respectively, and an open space 122a' defined by a corner portion of the second main portion 122a.

The first and second main portions 121a and 122a substantially determine an effective area and the first and second lead out portions 121b and 122b electrically connect the first and second main portions 121a and 122a and the first and second external electrodes 141 and 142.

The open space 122a' is provided to minimize deviations in capacitance caused by variations in an overlapping area of the first lead out portion 121b and the second main portion 122a.

A detailed description of the open space 122a' and the first and second main portions 121a and 122a will be described later.

In order for the internal electrodes and the external electrodes to be more smoothly connected, the first internal electrode 121 may further include a first extending part 121c connected to the first lead out portion 121b and the first external electrode 141, and the second internal electrode 122 may further include a second extending part 122c connected to the second lead out portion 122b and the second external electrode 142. Here, the first and second extending parts 121c and 122c may have an L-shape.

In order to restrain generation of a step due to an electrode thickness, a first dummy part 131 may be formed on the same plane as that of the first internal electrode 121 and formed in a position in which the first dummy part 131 overlaps the second extending part 122c and a second dummy part 132 may be formed on the same plane as that of the second internal electrode 122 and formed in a position in which the second dummy part 132 overlaps the first extending part 121c.

The first dummy part 131 may have the same shape as that of the second extending part 122c and the second dummy part 132 may have the same shape as that of the first extending part 121c.

The first and second external electrodes 141 and 142 are disposed on the exterior of the body and electrically connected to the first and second internal electrodes 121 and 122, respectively.

In the case of lower surface mounting, the first and second external electrodes 141 and 142 may be disposed on a lower surface of the body 110.

The first and second external electrodes 141 and 142 may extend from the lower surface of the body 110 to a side surface of the body 110 to surround corner portions of the lower surface of the body 110, forming an "L" shape.

The first and second external electrodes 141 and 142 may have a first electrode layer formed using a conductive paste and a second electrode layer and a third electrode layer formed as plating layers on the first electrode layer.

The second electrode layer and the third electrode layer may be formed by sequentially plating copper (Cu), nickel (Ni), tin (Sn), nickel (Ni), and tin (Sn) for soldering on a surface.

Hereinafter, the open space 122a' and the first and second main portions 121a and 122a of the present disclosure will be described in more detail.

The effective area, where the first and second internal electrodes 121 and 122 overlap each other with the dielectric layer 111 interposed therebetween, is a dominant factor in determining capacitance of the MLCC. However, when the internal electrodes of the MLCC are stacked, variations inevitably occur in areas in which the internal electrodes overlap each other due to process limitations. In particular, such variations in the effective area tend to easily occur as MLCCs are increasingly miniaturized.

In order to solve the problem, a method of minimizing variations in the effective area by differentiating sizes of the internal electrodes has been developed. If the sizes of the internal electrodes are different, overlapping areas of main portions may be maintained to be uniform although alignment slightly deviates, and thus, variations in the effective area may be minimized.

However, since the sizes of the internal electrodes are different, capacitance may be formed by a portion in which a lead out portion of a small internal electrode and a main portion of a large internal electrode overlap each other, and since the portion in which the lead out portion of the small internal electrode and the main portion of the large internal electrode overlap each other varies as the alignment deviates, variations in the effective area may be increased.

Also, in case in which the lead out portion is formed to be thin to minimize an influence on variations of the effective area by the portion in which the lead out portion of the small internal electrode and the main portion of the large internal electrode overlap each other, connectivity between the internal electrode and the external electrode may be degraded.

However, the MLCC 100 according to the exemplary embodiment may minimize variations in the effective area because the presence of the open space 122a' compensates for variations in capacitance formed by the area A1 or A1' in which the first lead out portion 121b and the second main portion 122a overlap each other.

Figure 4:
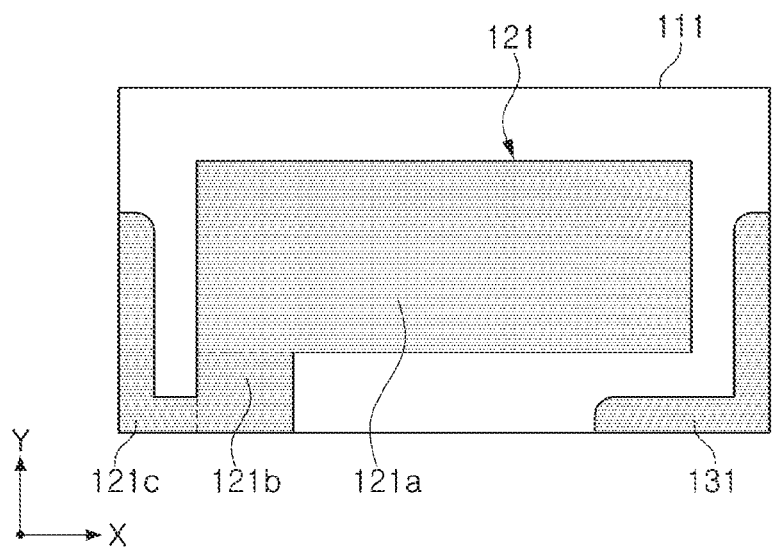
FIG. 4 is a view illustrating a ceramic green sheet with a printed first internal electrode used for manufacturing a multilayer ceramic capacitor according to an exemplary embodiment in the present disclosure.
Figure 5:
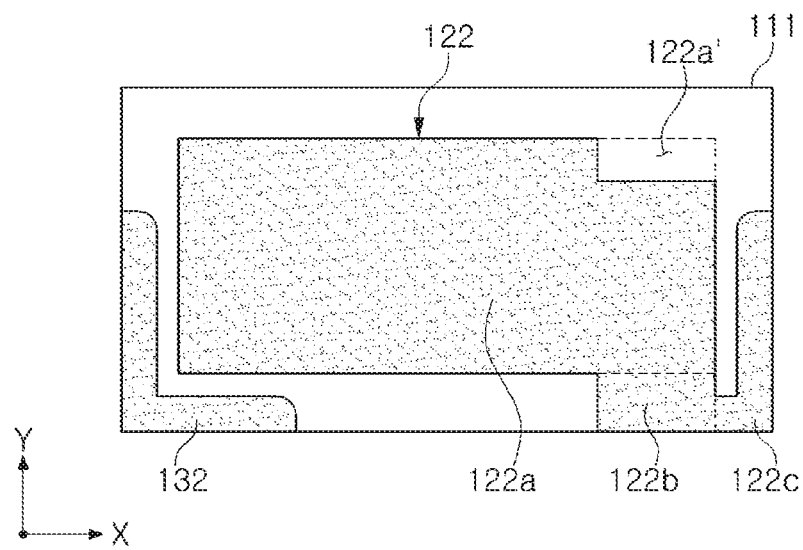
FIG. 5 is a view illustrating a ceramic green sheet with a printed second internal electrode used for manufacturing a multilayer ceramic capacitor according to an exemplary embodiment in the present disclosure.
Figure 6:
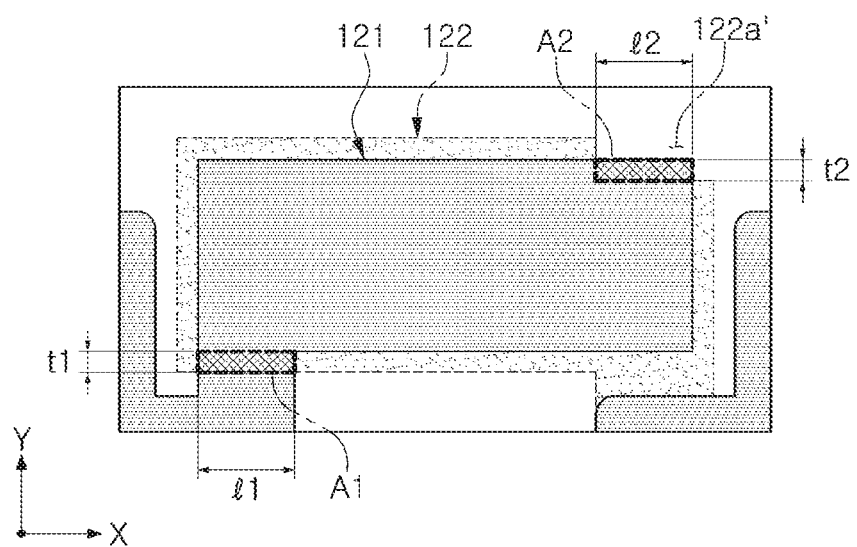
FIG. 6 is a view illustrating a case in which the ceramic green sheets of FIGS. 4 and 5 are aligned without misalignment, when stacked.
Figure 7:
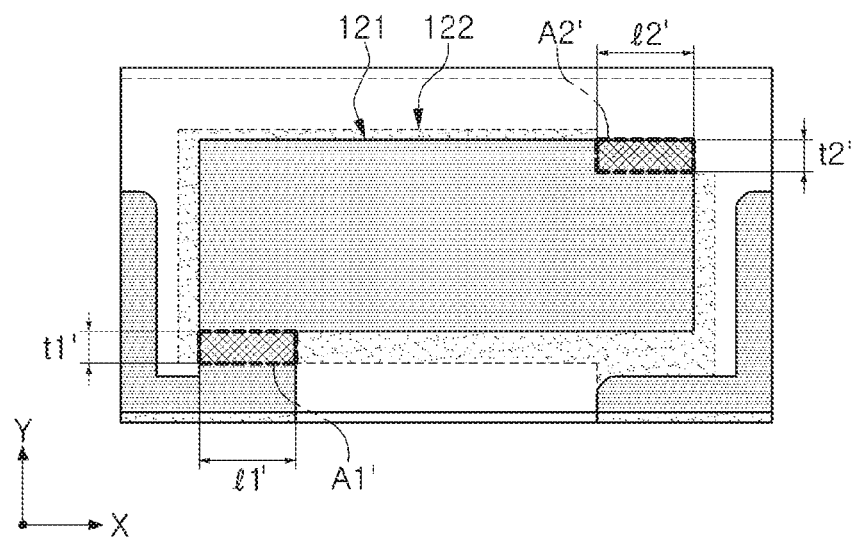
FIG. 7 is a view illustrating a case in which the ceramic green sheets of FIGS. 4 and 5 are misaligned, when stacked.

FIG. 4 is a view illustrating a ceramic green sheet with a printed first internal electrode used for manufacturing a multilayer ceramic capacitor according to an exemplary embodiment in the present disclosure. FIG. 5 is a view illustrating a ceramic green sheet with a printed second internal electrode used for manufacturing a multilayer ceramic capacitor according to an exemplary embodiment in the present disclosure. FIG. 6 is a view illustrating a case in which the ceramic green sheets of FIGS. 4 and 5 are aligned without misalignment, when stacked. FIG. 7 is a view illustrating a case in which the ceramic green sheets of FIGS. 4 and 5 are misaligned, when stacked.

A role of the open space will be described in more detail with reference to FIGS. 4 through 7. As illustrated in FIG. 5, the open space 122a' refers to an empty space portion in which a paste containing a conductive metal is not printed in the second main portion 122a.

When misalignment occurs during stacking, areas A1 and A1' in which the first lead out portion 121b and the second main portion 122a overlap each other increase, resulting in a variation of the effective area. That is, since the area A1' in FIG. 7 is increased to be larger than the area A1 of FIG. 6, a variation of the effective area occurs by the difference.

The open space 122a', in which an internal electrode is not printed so the open space 122a' does not contribute to formation of capacitance, and may compensate for capacitance formed by the areas A1 and A1' in which the first lead out portion 121b and the second main portion 122a overlap each other, and even in a case where the area in which the first lead out portion and the second main portion overlap each other is varied due to misalignment in the Y direction, since areas A2 and A2' in which the open space and the first main portion overlap each other are varied in proportion to the areas A1 and A1' in which the first lead out portion and the second main portion overlap each other, a variation of the effective area does not occur.

In a case in which the first and second lead out portions 121b and 122b are formed on lower portions of one side of the first and second main portions 121a and 122a, when alignment deviates in the Y direction as illustrated in FIG. 7, widths 11 and 11' of the first lead out portions 121b and widths 12 and 12' of the areas A2 and A2' in which the first main portion 121a and the open space 122a' overlap each other are not varied but remain the same, while a thickness t1 is increased to a thickness t1' by the misalignment in the Y direction, increasing the area A1 to the area A1', and a thickness t2 is increased to a thickness t2' by the misalignment in the Y direction, increasing an area A2 to an area A2'. Accordingly, since the areas A2 and A2' in which the open space and the first main portion overlap each other are varied in proportion to the areas A1 and A1' in which the first lead out portion 121b and the second main portion 122a overlap each other, the effective area is not varied.

Here, the open space 122a' may be formed at a corner diagonally opposed to the first lead out portion 121b. This is to prevent the open space 122a' from overlapping the first lead out portion 121b.

Meanwhile, the second main portion 122a is formed to be X % larger than the first main portion 121a, and the open space is X % larger than the area A1 in which the first lead out portion 121b and the second main portion 122a overlap each other, and, here, X may be within a range from 2 to 10. If X is less than 2, there is a possibility that the effective area may be varied, and if X exceeds 10, the effective area that can be secured may be reduced to reduce the capacity or increase the size of the MLCC undesirable for miniaturization.

For example, in case in which the second main portion 122a is 5% larger than the first main portion 121a, the open space 122a' may be formed to be 5% larger than the area A1 in which the first lead out portion 121b and the second main portion 122a overlap each other so that the area A1 in which the first lead out portion 121b and the second main portion 122a and the area A2 in which the open space and the first main portion overlap each other may be equal to each other.

Figure 8:
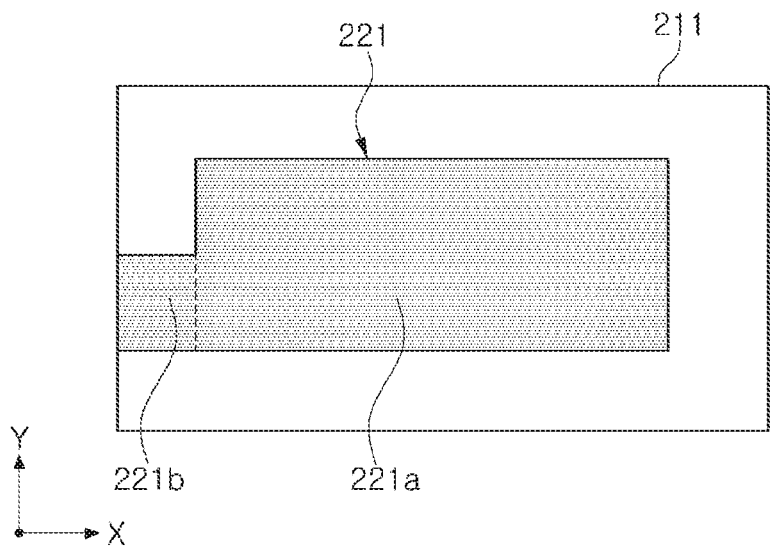
FIG. 8 is a view illustrating a ceramic green sheet with a printed first internal electrode used for manufacturing a multilayer ceramic capacitor according to another exemplary embodiment in the present disclosure.
Figure 9:
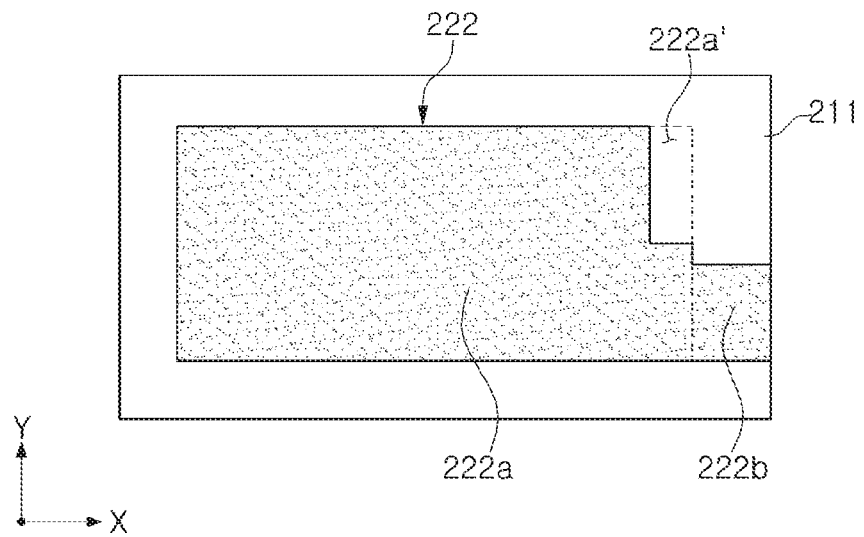
FIG. 9 is a view illustrating a ceramic green sheet with a printed second internal electrode used for manufacturing a multilayer ceramic capacitor according to another exemplary embodiment in the present disclosure.
Figure 10:
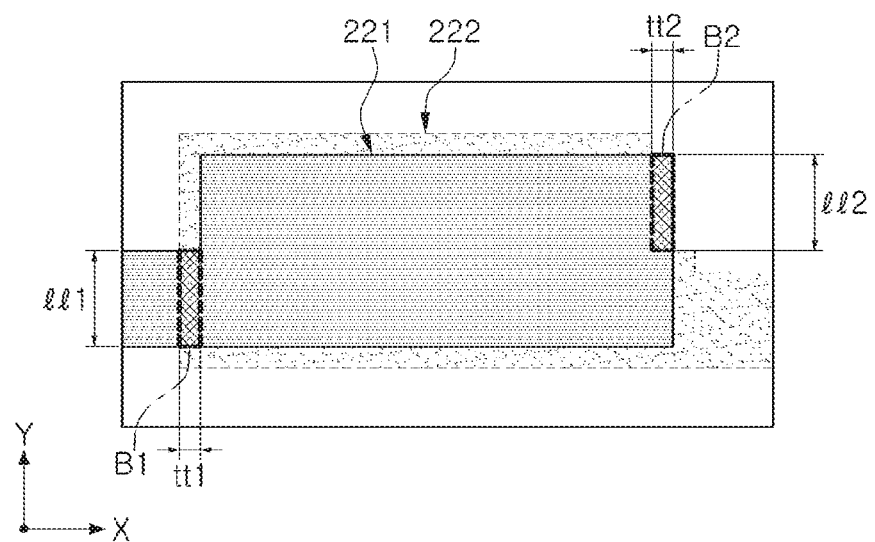
FIG. 10 is a view illustrating a case in which the ceramic green sheets of FIGS. 8 and 9 are aligned without misalignment, when stacked.
Figure 11:
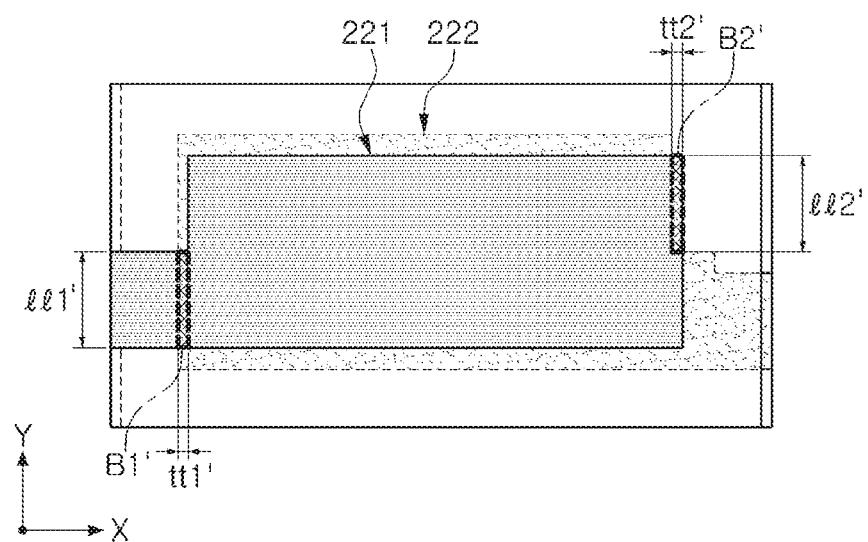
FIG. 11 is a view illustrating a case in which the ceramic green sheets of FIGS. 8 and 9 are misaligned, when stacked.

FIG. 8 is a view illustrating a ceramic green sheet with a printed first internal electrode used for manufacturing a multilayer ceramic capacitor according to another exemplary embodiment in the present disclosure. FIG. 9 is a view illustrating a ceramic green sheet with a printed second internal electrode is used for manufacturing a multilayer ceramic capacitor according to another exemplary embodiment in the present disclosure. FIG. 10 is a view illustrating a case in which the ceramic green sheets of FIGS. 8 and 9 are aligned without misalignment, when stacked. FIG. 11 is a view illustrating a case in which the ceramic green sheets of FIGS. 8 and 9 are misaligned, when stacked.

In case in which first and second lead out portions 221b and 222b are formed on portions of the sides of the first and second main portions 221a and 222a according to another exemplary embodiment in the present disclosure, when alignment deviates in the X direction as illustrated in FIG. 11, widths 111 and 111' of first lead out portions 221b and widths 112 and 112' of areas B2 and B2' in which the first main portion 221a and the open space 222a' overlap each other are not varied but remain the same, while a thickness tt1 is decreased to a thickness tt1' by the misalignment in the X direction, decreasing the area B1 to the area B1', and a thickness tt2 is decreased to a thickness tt2' by the misalignment in the Z direction, decreasing an area B2 to an area B2'. Accordingly, since the areas B2 and B2' in which the open space and the first main portion overlap each other are varied in proportion to the areas B1 and B1' in which the first lead out portion 121b and the second main portion 122a overlap each other, an effective area is not varied.

As set forth above, in the MLCC according to exemplary embodiments of the present disclosure, an influence on stacking precision is reduced by controlling the shape of the internal electrodes to thus minimize a variation of the effective area when stacking the internal electrodes, minimizing a capacitance variation.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
a body including a dielectric layer and first and second internal electrodes alternately disposed with the dielectric layer interposed therebetween; and
first and second external electrodes disposed on at least one surface of the body and respectively connected to the first and second internal electrodes,
wherein the first internal electrode includes a first main portion and a first lead out portion connecting the first main portion and the first external electrode,
the second internal electrode includes a second main portion and a second lead out portion connecting the second main portion and the second external electrode, and
the second main portion has a greater area than the first main portion and includes a corner portion defining an open space to compensate for a capacitance formed by an area in which the first lead out portion and the second main portion overlap each other.

2. The multilayer ceramic capacitor of claim 1, wherein the first and second lead out portions are formed on lower portions of the first and second main portions, respectively.

3. The multilayer ceramic capacitor of claim 1, wherein the first and second lead out portions are formed on portions of side surfaces of the first and second main portions, respectively.

4. The multilayer ceramic capacitor of claim 1, wherein the open space is formed at a corner diagonally opposed to the first lead out portion.

5. The multilayer ceramic capacitor of claim 1, wherein the second main portion is X % larger than the first main portion, the open space is X % greater than an area in which the first lead out portion and the second main portion overlap each other, and X is within a range from 2 to 10.

6. The multilayer ceramic capacitor of claim 1, wherein the first internal electrode further includes a first extending part connected to the first lead out portion and the first external electrode, and
the second internal electrode further includes a second extending part connected to the second lead out portion and the second external electrode.

7. The multilayer ceramic capacitor of claim 6, wherein the first and second extending parts have an "L" shape.

8. The multilayer ceramic capacitor of claim 6, further comprising:
a first dummy part formed on the same plane as that of the first internal electrode and disposed to overlap the second extending part; and
a second dummy part formed on the same plane as that of the second internal electrode and disposed to overlap the first extending part.

9. The multilayer ceramic capacitor of claim 8, wherein the first dummy part has the same shape as that of the second extending part, and the second dummy part has the same shape as that of the first extending part.

10. The multilayer ceramic capacitor of claim 1, wherein the first and second external electrodes include a plating layer.

11. The multilayer ceramic capacitor of claim 1, wherein the first and second external electrodes have an "L" shape.

12. The multilayer ceramic capacitor of claim 1, wherein an area of overlap between the first main portion and the open space varies in proportion to an area of overlap between the first lead out portion and the second main portion.

* * * * *